United States Patent

Snider, Jr.

[15] 3,649,040
[45] Mar. 14, 1972

[54] SKI ASSEMBLY FOR AUTOMOTIVE VEHICLES

[72] Inventor: Roy C. Snider, Jr., Ames, Iowa
[73] Assignee: Joseph Ducharme
[22] Filed: Jan. 12, 1970
[21] Appl. No.: 2,047

[52] U.S. Cl. ................................280/14, 180/3
[51] Int. Cl. .................................B62m 27/00, B62b 17/02
[58] Field of Search.....................280/14, 9, 21; 180/3, 5, 6

[56] References Cited

UNITED STATES PATENTS

| | | | |
|---|---|---|---|
| 1,023,255 | 4/1912 | Kron | 280/14 |
| 3,128,128 | 4/1964 | Jines | 301/44 |
| 3,480,289 | 11/1969 | Larkin | 280/21 |

Primary Examiner—Leo Friaglia
Attorney—Zarley, McKee & Thomte

[57] ABSTRACT

A ski assembly detachably connected to each of the front wheels of an automobile wherein a ski mounting hub is carried on the bolts connecting the front wheels to the front wheel brake drums. A hollow sleeve extends outwardly and is telescopically received in a sleeve carried on an upstanding support triangular in shape having a ski runner at the bottom thereof. The two telescoping sleeves have adjacent end plates which are bolted together such that the ski unit may be removed from the wheel by removal of the one bolt connecting the sleeves together leaving the ski mounting hub on the vehicle's front wheel. A second set of threaded nuts secure the ski mounting hub to the wheel studs and against the threaded nuts holding the wheel on the brake drum.

9 Claims, 5 Drawing Figures

Patented March 14, 1972
3,649,040
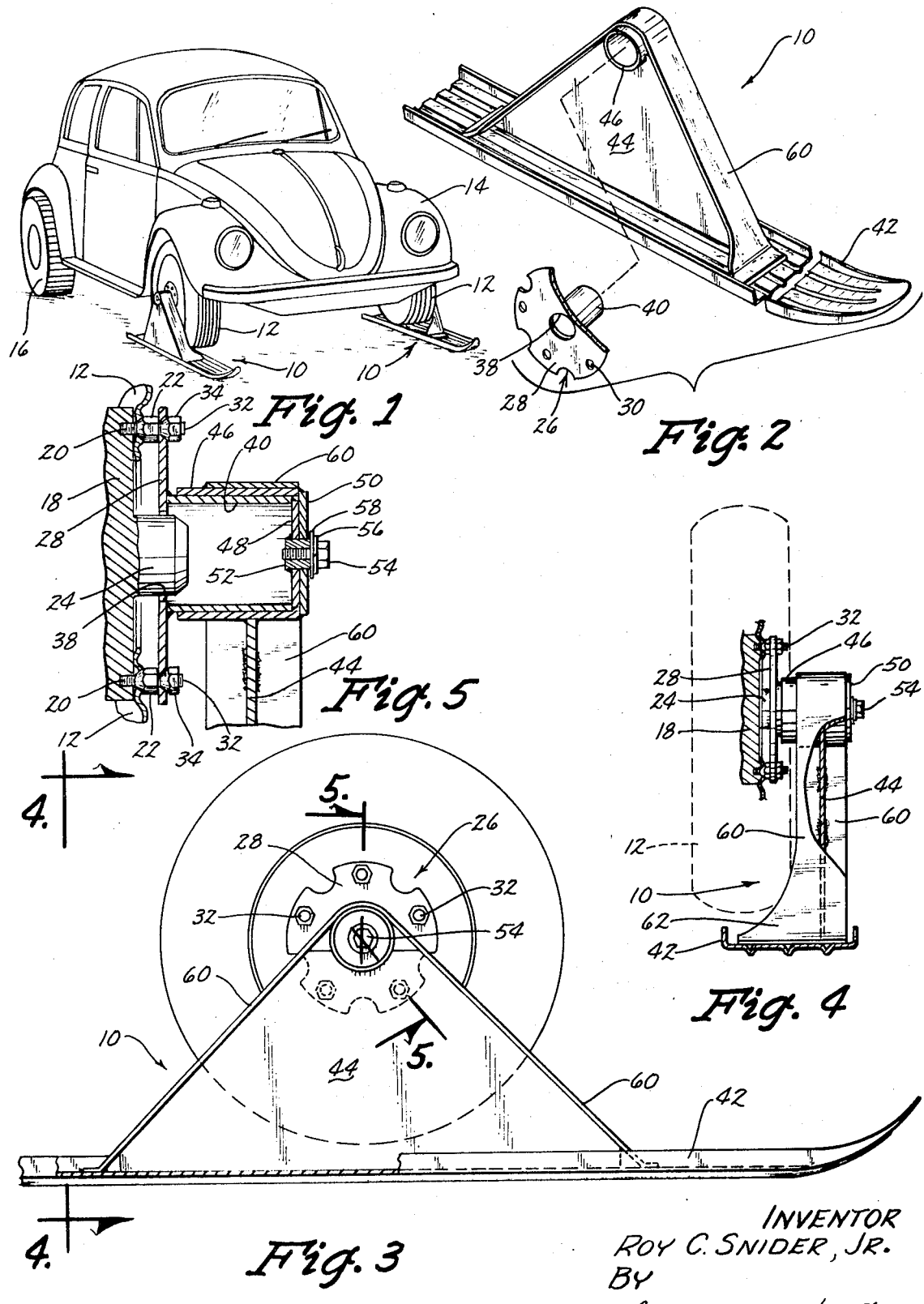
INVENTOR
ROY C. SNIDER, JR.
BY
Zarley, McKee & Thomt
ATTORNEYS

SKI ASSEMBLY FOR AUTOMOTIVE VEHICLES

Outdoor winter sports are becoming more popular each year. Snowmobiles and other types of all-terrain type vehicles are available but very expensive and limited in their use to recreational type activities.

The ski assembly of this invention makes it possible to use a conventional automobile such as a Volkswagen as a snow type pleasure vehicle by quickly mounting a pair of skis on the front wheels of the vehicle. For traction in the rear, conventional tires may be used or if preferred the low pressure wide-tread type tires may be substituted. A further alternative is that a tread type drive arrangement may be provided.

The ease of attaching or removing the skis is made possible by the fact that just a single bolt on each side connecting the telescoping sleeves together is employed. Also, it is seen that the entire ski mounting is secured in place on the wheel by a second set of threaded nuts carried on the wheel mounting bolts.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of a vehicle employing the ski assemblies of this invention.

FIG. 2 is an exploded perspective view of the ski assembly.

FIG. 3 is a fragmentary side elevation view of the ski assembly.

FIG. 4 is a cross-sectional view taken along line 4—4 in FIG. 3; and

FIG. 5 is a cross-sectional view taken along lines 5—5 in FIG. 3.

The ski assembly of this invention is referred to generally by the reference numeral 10 as seen in FIG. 2 and is shown mounted on the front wheels 12 of a Volkswagen vehicle 14 in FIG. 1. Extra wide rear traction tires 16 have been substituted for the conventional tires on the Volkswagen to give better traction.

The steerable front wheels of the Volkswagen include a vehicle wheel hub or brake drum 18 (FIG. 5) which carries the wheel 12 secured thereto by bolts 20 threadably received in the hub 18. A first set of threaded nuts 22 hold the wheel 12 in place on the hub 18. An axle 24 extends outwardly of the hub 18.

The ski assembly 10 includes a ski mounting hub 26 (FIG. 2) having a mounting plate 28 with peripheral holes 30 to receive the outer ends 32 of the threaded studs 20. A second set of threaded nuts 34 holds the mounting plate 28 against the first set of threaded nuts 22 on the threaded studs 20. It is seen that the ski mounting hub may be removed independently of the removal of the wheel 12 by disengaging the nuts 34 from the studs 20. An axial opening 38 is provided which communicates with an outwardly extending sleeve member 40 and it is seen the wheel axle 24 is received in the opening 38 and the sleeve 40 in FIG. 5.

A ski runner 42 includes a triangular shaped upstanding web support 44 which includes a sleeve 46 at the top apex thereof for telescopically embracing the ski mounting hub sleeve 40. The ski mounting hub 40 and the sleeve 46 have end walls 48 and 50 respectively which matingly engage each other as seen in FIG. 5. The end wall 48 includes an integral collar 52 which extends out through the end wall 50 to provide a guide and bearing surface. A bolt 54 extends through a lock washer 56 and a flat washer 58 into the threaded collar 48 for securing the sleeves 46 and 48 together. It is by the removal of this one bolt 54 that the ski assembly 10 may be removed from the vehicle. The ski assembly 10 may be installed by raising the vehicle through use of a conventional jack.

Additional strength is given the support web 44 by the provision of a length of sheet metal 60 which extends from the front end of the ski runner 42 over the sleeve 46 and down into engagement with the rear end of the ski runner 42 as best seen in FIG. 3. It is noted that the sheet material 60 is enlarged in width at 62 below the wheel 12 such that a portion of the ski runner 42 may extend under the wheel 12 to minimize the total width of the vehicle with the skis.

Thus it is seen in operation that the ski assembly 10 may be placed on a vehicle by simply removing the hubcaps on the front wheels and substituting studs 20 having two threaded nuts 22 and 34. The studs 20 may be threaded into the wheel hub 18 or may be integral therewith and extend outwardly far enough to extend through the two nuts 22 and 34. The use of the conventional vehicle jack may be used to raise the vehicle such that the front wheels are just off the ground for the skis to extend thereunder.

The operation of the automobile is the same with the skis as without. There will be little wear on any parts of the ski assembly since the ski unit will rock back and forth slightly through the telescopic connection of the sleeves 46 and 40. The end plates 48 and 50 matingly engage each other and will incur a minimum of wear as will the engagement of the end plate 50 on the collar 52.

When it is desired to remove the skis it is only necessary to remove the bolt 54 and leave the ski mounting hub 26 on the front wheels 12. The car can be drive as usual with the ski mounting hub left on and then when it is desired to reinstall the ski assembly 10 the bolt 54 may be reinserted. It is locked in place through the use of the washers 56 and 58.

I claim:

1. A ski vehicle comprising,
an automobile having front steerable wheels, said wheels being secured to wheel hubs by a plurality of bolt means, said wheel hubs being mounted on wheel axles,
a ski assembly including a ski runner secured to an upstanding support member having a sleeve secured at the top thereof,
ski mounting hubs detachably secured to said automobile wheels and having oppositely extending members telescopically engaging said sleeves,
said sleeves and said ski mounting hub members each having rigid end plates in adjacent relationship,
a connecting bolt means detachably securing said adjacent end plates together, and
said connecting bolt means each include an internally threaded collar rigidly secured to said end plate on said ski mounting hub member, and said collar extends through an opening in said end plate on said sleeve.

2. The structure of claim 2 wherein said ski mounting hubs each include a mounting plate having a plurality of holes spaced around and adjacent the periphery thereof and said plurality of bolt means extending through said holes, and said mounting plate having a center opening in communication with a chamber formed in said oppositely extending members to receive the outer end of said wheel axles.

3. The structure of claim 2 wherein each of said plurality of bolt means include a threaded nut on opposite sides of said ski mounting hub whereby said ski mounting hubs may be secured on said wheel hubs independently of said wheels.

4. The structure of claim 3 wherein said nuts between said wheel and said ski mounting hub are integral with said bolt means and said other nut on the opposite side of said ski mounting hub are detachable.

5. The structure of claim 3 wherein said upstanding support member is triangular in shape with said sleeve being at the top apex thereof.

6. The structure of claim 5 wherein said triangular in shape upstanding support is a web wall extending between said ski and sleeve and a length of sheet material extends along the periphery of said web wall from engagement on opposite sides with said ski over the top of said sleeve, and said length of sheet material is perpendicular to said web wall.

7. The structure of claim 6 wherein said length of sheet material is wider at the bottom thereof and extends inwardly under said wheel whereby said ski is partially positioned under said wheel.

8. A ski assembly including a ski runner secured to an upstanding support member having a sleeve secured at the top thereof,
a ski mounting hub adapted to be detachably secured at its inner end to an automobile wheel and having the outer end of said hub being telescopically and rotatably received in said sleeve,
said sleeve and said ski mounting hub each having rigid end plates in substantial abutting relationship, and
a connecting bolt means detachably securing said adjacent end plates together along their axial center whereby relative axial movement therebetween is prevented and said hub is centered in said sleeve for relative free rotation therebetween.

9. The structure of claim 8 wherein said connecting bolt means includes an internally threaded collar rigidly secured to said end plate on ski mounting hub member, and said collar extends through an opening in said end plate on said sleeve.

* * * * *